(12) United States Patent
Ciotti et al.

(10) Patent No.: US 8,556,046 B2
(45) Date of Patent: Oct. 15, 2013

(54) PAD FOR A BRAKE CALIPER AND BRAKE CALIPER FOR A DISC BRAKE

(75) Inventors: Alessandro Ciotti, Bergamo (IT); Armando Puddu, Bergamo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 161 days.

(21) Appl. No.: 13/055,391

(22) PCT Filed: Jul. 22, 2008

(86) PCT No.: PCT/IT2008/000493
§ 371 (c)(1),
(2), (4) Date: Jan. 21, 2011

(87) PCT Pub. No.: WO2010/010583
PCT Pub. Date: Jan. 28, 2010

(65) Prior Publication Data
US 2011/0127126 A1    Jun. 2, 2011

(51) Int. Cl.
*F16D 69/00*    (2006.01)
(52) U.S. Cl.
USPC ............... 188/250 G; 188/250 B; 188/250 F; 188/73.45
(58) Field of Classification Search
USPC ............................................. 188/73.44, 73.45
See application file for complete search history.

(56) References Cited

U.S. PATENT DOCUMENTS

| | | | | |
|---|---|---|---|---|
| 4,022,302 A * | 5/1977 | Janssen | ......................... | 188/73.1 |
| 4,093,043 A * | 6/1978 | Smith | ......................... | 188/73.46 |
| 5,377,792 A * | 1/1995 | Idesawa | ..................... | 188/264 G |
| 7,267,208 B2 * | 9/2007 | Jedele et al. | ............... | 188/73.38 |
| 7,377,368 B2 * | 5/2008 | Schog et al. | ............... | 188/73.31 |
| 8,205,726 B2 * | 6/2012 | Schorn et al. | .............. | 188/73.37 |
| 2004/0154885 A1 * | 8/2004 | Gotti et al. | ................ | 188/250 B |
| 2004/0173420 A1 * | 9/2004 | Macke et al. | .............. | 188/250 G |
| 2007/0056812 A1 * | 3/2007 | Haupt et al. | ............... | 188/73.39 |
| 2008/0087507 A1 * | 4/2008 | DeMorais et al. | ......... | 188/73.39 |
| 2011/0198170 A1 * | 8/2011 | Turani et al. | .............. | 188/250 B |
| 2012/0043168 A1 * | 2/2012 | Narayanan V et al. | ...... | 188/72.1 |

FOREIGN PATENT DOCUMENTS

| | | |
|---|---|---|
| DE | 2931216 | 3/1981 |
| DE | 4416815 | 11/1995 |
| EP | 1862691 | 12/2007 |
| WO | WO 2005064188 A1 * | 7/2005 |
| WO | 2005/108817 | 11/2005 |

* cited by examiner

*Primary Examiner* — Thomas Irvin
(74) *Attorney, Agent, or Firm* — Shoemaker and Mattare (57) ABSTRACT

The present invention relates to a pad for brake caliper and to a brake caliper for disc brake provided with one or more of such pads. The pads are provided with one or more eyelets suitable to receive corresponding pins of the caliper. The pins define pin outlines, and the eyelets define eyelet outlines. The pin outlines have one or more curved pin contact portions with pin curvature radii, and the eyelet outlines have one or more curved eyelet contact portions with eyelet curvature radii. The contact between pads and pins at least partially occurs at the pin and eyelet contact portions. The eyelet curvature radii are higher than the pin curvature radii.

20 Claims, 6 Drawing Sheets

PAD FOR A BRAKE CALIPER AND BRAKE CALIPER FOR A DISC BRAKE

The object of the present invention is a pad for a brake caliper and a brake caliper of a disc brake.

Known brake calipers are provided with pads which are suitable to engage a braking band of a brake disc to cause the slowing down of the vehicle on which the brake caliper is installed.

According to a type of known brake calipers, the pads are supported by pins connected to the caliper body of the brake caliper, and comprise eyelets in which the pins are inserted with clearance, so as to be able to slide along them when subjected to the action of special pushing means. According to this type of calipers, the pins have further the function of transmitting the braking force to the caliper itself.

Usually, each pad has two opposite eyelets relative to a central portion of the pad, on which is applied the friction material, and the caliper comprises two corresponding pins.

The eyelets usually have a squared shape, with rounded or bevelled angles. On the other hand, the pins supporting the pads are usually of a cylinder shape with a circular cross-section. The distance and the size of eyelets and pins are selected so that, during a braking action, the pad is put under traction and transmits the braking force to the pin arranged at the brake disc inlet side in the space between the pads, while the pin arranged on the outlet side of the disc only implements a radial rest relative to the brake disc rotational axis.

The eyelets, in particular the angles thereof, and the pins, are shaped so that, during the braking action, the mutual contact between pin to which the braking force is transmitted, and the eyelet takes essentially place in two contact points, in particular a first point in which the pin supports the pad, and a second point in which the braking force is transmitted to the pin during the braking action.

However, such known brake calipers are not free from drawbacks.

In fact, as soon as the braking action is initiated, the pad can freely move and accelerate, thanks to the clearance with which it is connected to the pins, and therefore impinges against one of them, in particular in the second point identified above. Such impact causes the emission of a sound, known as squeal. It shall be apparent that such circumstance is still more critical in the case of successive forward speed-braking action-reverse gear-braking action, or vice versa, since there are more impacts of the pads, alternatively against the two supporting pins. The squeals typically involve a poor comfort of the vehicle on which the brake caliper is installed.

Therefore, the object of the present invention is to provide a pad for a brake caliper and a brake caliper of a disc brake such as to at least partially overcome the drawbacks cited with reference to the prior art.

In particular, the object of the present invention is to provide a pad for a brake caliper and a brake caliper of a disc brake in which the previously described squeal phenomenon is eliminated or at least partially reduced, thereby the comfort of the vehicle on which the caliper is installed is improved.

These and other objects are achieved by a pad for a brake caliper of a disc brake according to claim 1, and a brake caliper for a disc brake according to claim 17.

In order to better understand the invention, and appreciate the advantages thereof, some exemplary, non-limiting embodiments thereof will be described herein below, with reference to the annexed Figures, in which.

With reference to the Figures, a brake caliper of a disc brake, in particular for use in motor vehicles, is generally indicated with the reference numeral 1. The following description is given, by way of example only, with reference to a disc brake of the fixed caliper type, but the disc brake can usefully be also of a different type, for example of the floating caliper type.

The disc brake further comprises a brake disc (not illustrated in the Figures) which can rotate around a rotational axis R, and partially housed in a disc space 4 defined by the same caliper 1. The caliper 1 can be fixed, for example, through securing screws, to a vehicle suspension, while the brake disc, provided with an annular braking band, is connectable to a wheel hub of the vehicle.

Figures 1, 2:
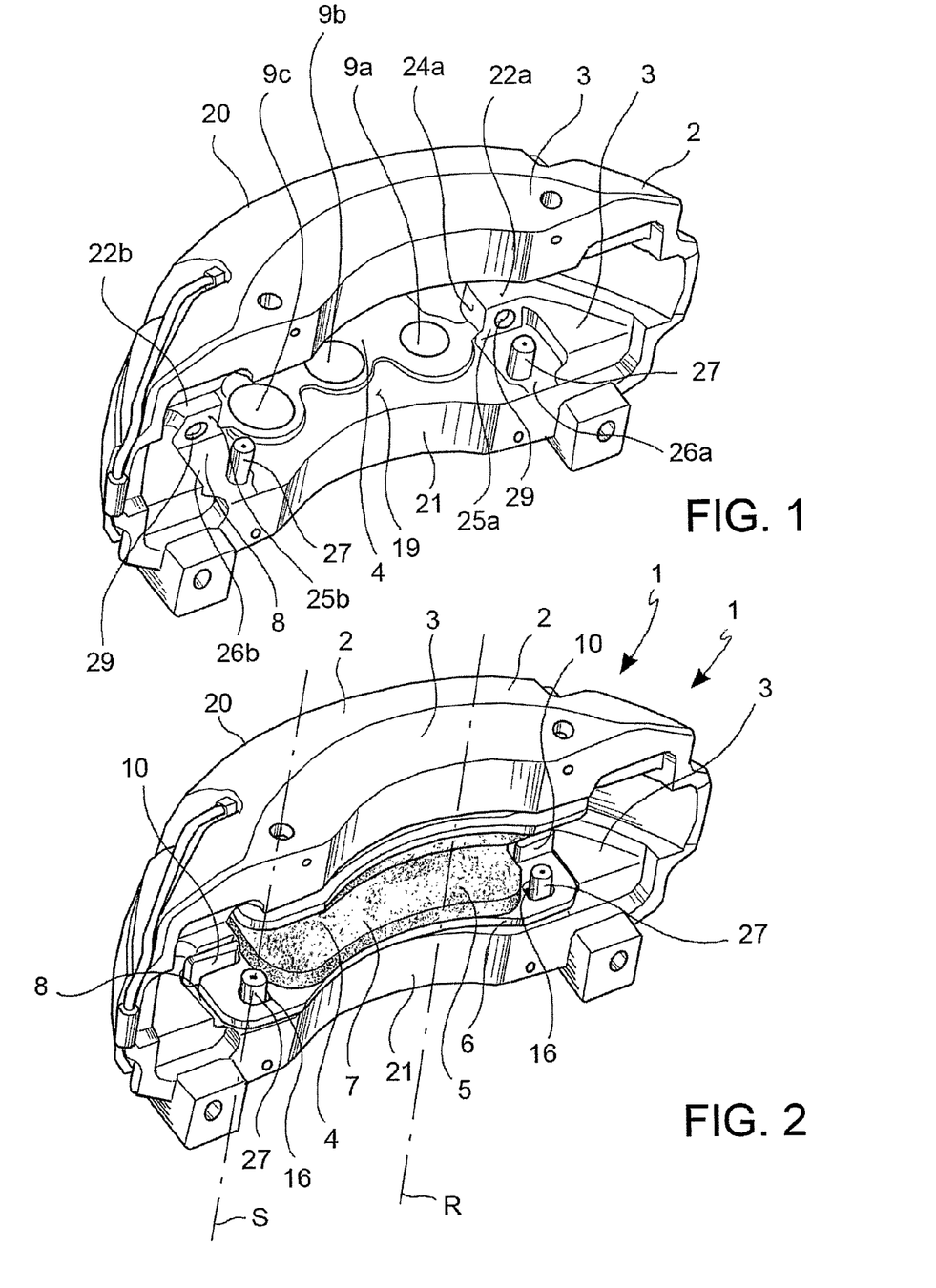
FIG. 1 is a perspective view of a brake caliper for disc brake according to the invention.
FIG. 2 is a perspective view of the brake caliper of FIG. 1, provided with two pads.

The caliper 1 comprises a caliper body 2 with two side walls 3 arranged on both sides of the disc and mutually connected by connecting members 20 extending astride the braking band.

One or more pads 5, for example two of such pads 5, which preferably respectively comprise a plate 6, for example in steel, and a coating in friction material 7 which can be connected to the plate 6, are arranged each on a side of the brake disc at the braking band and received in special seats 8 of the caliper 1.

The pads 5, which can be moved in the direction perpendicular to the brake disc plane along a sliding direction S, can be affected by pushing means, such as, for example, one or more hydraulic cylinder-piston units 9a, 9b, 9c arranged in the caliper 1, so as to clamp, by means of the friction coating 7, a braking band sector, the surface and shape of which preferably corresponds to that of the friction coatings 7.

In order to prevent the pads 5 from beating in the seats 8 during the vehicle is running when the brake is inactivated, special springs 10 can be provided, which exert an elastic preload on the pads 5 in order to stop then in the seats 8.

Figure 3:
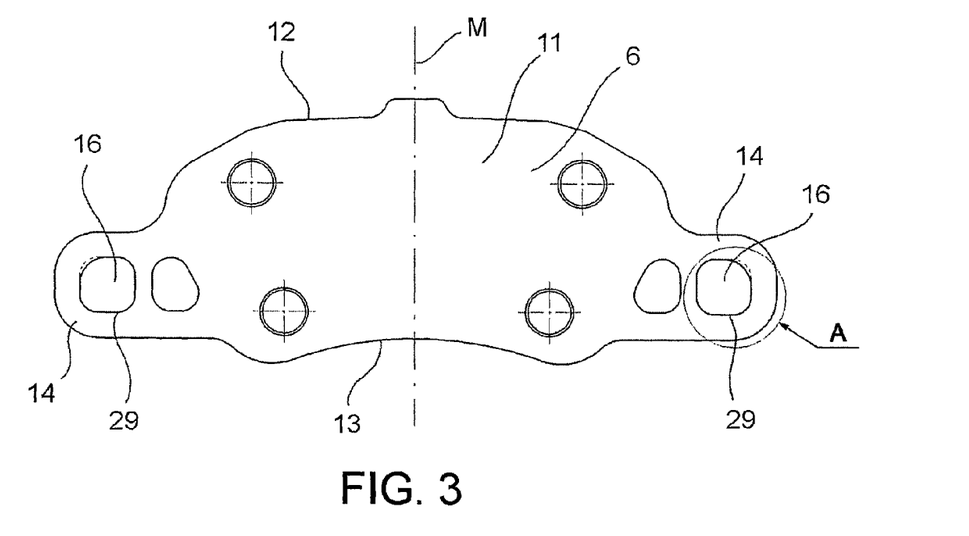
FIG. 3 is a side view of a pad plate of the brake caliper according to a possible embodiment of the invention.

In accordance with a possible embodiment, the plate 6 of each pad 5 is essentially planar, and has a central portion 11 having essentially the shape of a distorted rectangle. Such central portion 11 has an upper edge 12 and a lower edge 13 opposite the upper edge 12. Preferably, the upper edge 12 is essentially convex, and the lower one 13 is essentially concave.

The plate 6, i.e. the central portion 11 thereof, further comprises two side edges, in particular a front edge 6b and a rear edge 6a opposite the front edge 6b. With reference to the disc rotation direction corresponding to the vehicle forward gear, the braking band, passing through the caliper 1, conventionally firstly meets front side edge 6b and subsequently the rear side edge 6a of the plate 6.

The pads 5 comprise one or more eyelets 16, which are preferably formed in the plate 6 outside the area in which the friction material 7 is provided. Each eyelet 16 is intended to receive, preferably with clearance, a respective pin 27 of the caliper 1. According to a possible embodiment, each pad is provided with two of such eyelets 16, and the brake caliper 1 is provided with two of such pins 27, preferably arranged so that, following the clamping of the braking band by the pads, the latter are drawn on one or the other of such two pins as a function of the brake disc rotation direction (as it will be described below, such solution involves dragging the pad during the braking actions). For example, the eyelets 16 can be arranged in the proximity of the two side edges 6a and 6b, preferably in support projections 14 extending essentially transversally or perpendicularly from the plate 6 side edges 6a and 6b. The support projections 14 preferably lie in the same plane of the plate 6 and, even more preferably, are manufactured as one piece with the latter. Advantageously, the support projections 14 have an essentially rectangular shape, preferably with rounded angles.

Preferably, each pair of two pins 27 supports only one of the pads 5. In this manner, each of the pads arranged on the two sides of the brake disc can clamp the latter on both sides thereof, by sliding along the respective pairs of pins 27 housed in the respective eyelets.

The pins 27 can be manufactured in a single piece with the caliper 1 or, alternatively, can be manufactured separately in a suitable material, and subsequently fixed to the caliper 1 side walls 3.

The eyelets 16 and the pins 27 have shapes which are suitable to control the relative movements between the same pins 27 and the pad 5 during the braking action. In particular, with reference to transversal planes to the sliding direction S previously defined, the pins 27 define pin outlines 28 and the eyelets 16 define eyelet outlines 29. The pin outlines 28 essentially coincide with the contour of the sectional surfaces of the pins 27 according to one of the above-mentioned section planes, and the eyelet outlines 29 essentially coincide with the perimeters of the eyelets 16 openings.

It should be understood that the concepts of pin outlines and eyelet outline are to be intended in the ideal geometrical sense. In fact, it shall be apparent that a surface or a real contour of the pins and/or the eyelets actually has irregularities, which are due, for example, to surface roughness. Therefore, the geometrical outlines do not precisely replicate the real outline of the pins/eyelets but define of course the theoretical overall trend thereof. Therefore, it has to be taken into account that, when in the present description and in the annexed claims, reference will be made to the pin and eyelet outlines, it will be referred to the theoretical geometrical outlines thereof.

The pin outlines 28 comprise one or more curved pin contact portions 28' suitable to be kept in contact with corresponding one or more eyelet contact portions 29', also curved, of the eyelet outlines 29. During use conditions of the caliper 1, the mutual contact between pads 5 and pins 27 takes at least partially place along such pin 28' and eyelet 29' contact portions. It should be understood that such relative contact is not necessarily static, but is such to allow also small relative movements of the pads relative to the pins just along such contact portions, as will be explained below.

The curvatures of the curved pin 28' and eyelet 29' contact portions are respectively defined by pin curvature radii Rp and eyelet curvature radii Ro. Such pin Rp and eyelet Ro curvature radii can have various trends. In particular, they can be variable according to a predetermined law, or can be constant. Possible laws for the variation of the curvature radii will be described below, with reference to some preferred embodiments of the invention.

Advantageously, the eyelet curvature radii Ro of the eyelet contact portions 29' are higher than the pin curvature radii Rp of the pin contact portions 28'.

Figure 12:
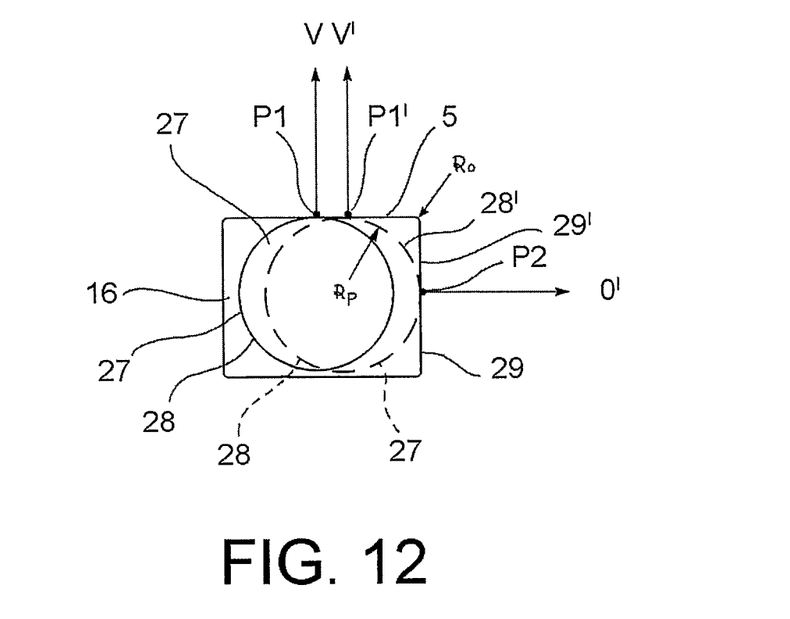
FIG. 12 is a schematic illustration of the contact modes between a brake caliper pad and pin according to the prior art.
Figure 13:
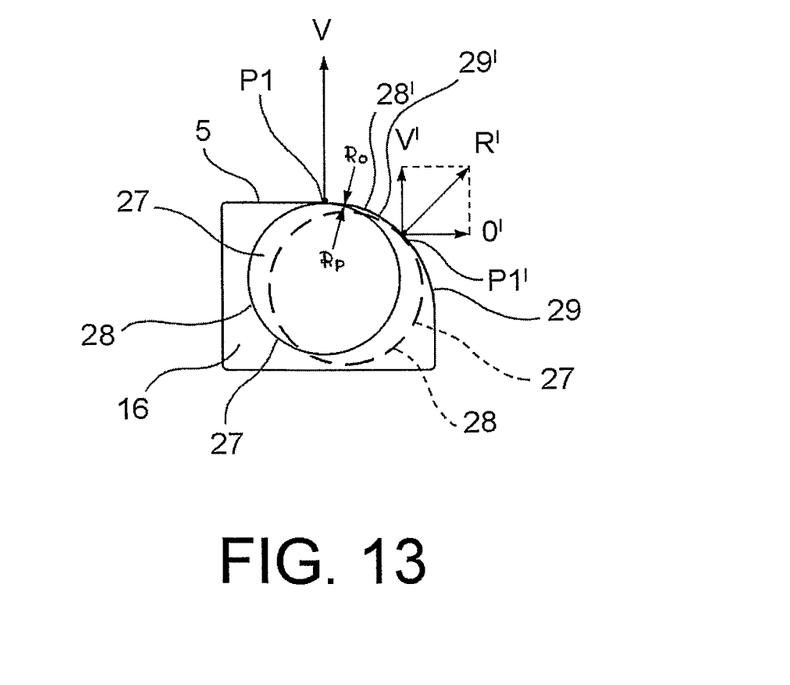
FIG. 13 is a schematic illustration of the contact modes between a brake caliper pad and pin according to the invention.

In order to better understand the advantageous effects of such configuration for the eyelets 16 and pins 27 in the caliper according to the invention, reference is to be made to the FIGS. 12 and 13. In such Figures, the pin outline 28 and the eyelet outline 29 are schematically illustrated with the respective pin 28' and eyelet 29' contact portions.

The pin outline 28 is illustrated in two distinct use conditions, that is, under rest or running conditions (solid line) and under braking action conditions (dotted line) of the caliper. FIG. 12 refers to brake calipers according to the prior art, in which the eyelet curvature radii Ro of the eyelet contact portions 29' are lower than the pin curvature radii Rp of the pin contact portions 28'.

With reference to the known calipers (FIG. 12), under rest or running conditions, the contact between pin 27 and pad 16 essentially occurs at a point P1. At the point P1 between pin 27 and pad 16, there is a vertical force V. It should be understood that such vertical force V is mainly due to the presence elastic means (not shown) pushing the pad essentially towards the disc R rotational axis. It shall be further noticed that the term "vertical", (as well as the term "horizontal", which will be used below) is merely conventional, and refers to the orientation illustrated in the Figure. When the braking action initiates, the pad performs a movement, mainly due to the friction force between the pad friction material and the braking band of the brake disc. For example, if the pad 6 moves from the right to the left side in FIG. 12 (to which an anti-clockwise rotation direction of the brake disc corresponds, which is not illustrated), the pin 27 impinges quite instantaneously against the eyelet 16 delimiting wall, which define the eyelet outline 29 thereof, at the point P2, while the contact point P1 moves to the point P1'. At the point P1' a vertical force V' is still present, while at the point P2, a horizontal force O' abruptly originates, exchanged between pad 5 and pin 27. The squeal phenomenon is due to such impact.

Now, with reference to a caliper and a pad according to the invention (FIG. 13), since the eyelet curvature radius Ro of the eyelet contact portion 29' is higher than the pin curvature radius Rp of the pin contact portion 28', the pad 5 eyelet 16 is able to move relative to the pin 27 along the pin contact portion 28' in a gradual manner, similarly to what occurs, for example, between a cam and a follower. Consequently, the point P1 moves with continuity and a horizontal force O' gradually originates. The horizontal OR' and vertical V' forces originate a resulting mobile force R'. Differently from what happens in the known calipers, there is no second contact point P2 and the horizontal force O' does not originate abruptly. In this manner, the squeal phenomenon turns out to be dramatically reduces. In particular, the squeal phenomenon is quite eliminated if, as it is preferred, the eyelet 16 and the pin 27 are shaped and arranged so that the contact between the respective contact portions thereof takes place solely on the only point P1 (P1') and does not involve other points (for example, those in the bottom area of FIG. 13).

The pin outlines 28 are preferably of an essentially circular shape. In other terms, the pin curvature radii Rp of the pin contact portions 28' are essentially constant. Of course, it is possible to provide pin contact outlines 28' having different shapes, while still being suitable to achieved the same technical effect (for example, pin contact outlines having elliptic or partially elliptic shapes).

Advantageously, the eyelet outlines 29 are closed. In particular, in accordance with a preferred embodiment, the eyelets 16 have an essentially rectangular or squared shape with rounded angles. Such rounded angles include an outer upper angle 30, an outer lower angle 31, an inner lower angle 32, and an inner upper angle 33. The upper angles are angles facing the plate 6 upper edge 12, while the lower angles are angles facing the plate 6 lower edge 13. The inner angles face the plate 6 central portion 11, while the outer angles face the plate 6 outer part. Advantageously, one or more of such rounded angles form the eyelet contact portions 29'.

The eyelet outlines 29 can have several configurations, according to the brake caliper application and the orientation thereof when in use.

Figure 4:
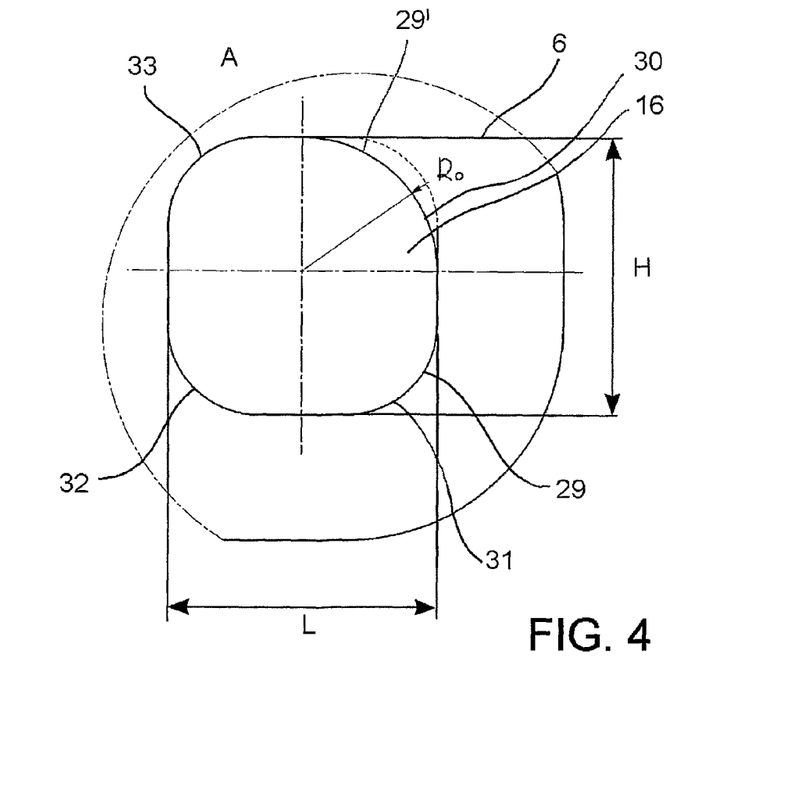
FIG. 4 is a enlargement of the detail A of the plate in FIG. 3.

In accordance with a possible embodiment, the eyelet outlines 29 have a single eyelet contact portion 29', and such single eyelet contact portion 29' is preferably arranged at the outer upper angle 30 (FIGS. 3-4). The eyelets 16 are preferably two for each plate 6, and arranged on two opposite sides of such plate, for example, at the two support projections 14. Advantageously, the two eyelets 16 have eyelet outlines 29 which are mutually symmetric relative to the pad median axis M, passing through the upper 12 and lower 13 edges thereof, so that the pad has an essentially uniform behaviour in the braking actions which intervene starting from the forward gear or the reverse gear of the vehicle on which the caliper 1 is installed. Still more advantageously, the eyelet curvature radius Ro of the single eyelet contact portion 29' is essentially constant, and the latter has preferably a width of 90°, so that the two eyelet contact portions 29' of the two opposite eyelets 16 form circumferences quarters, the centres of which are placed inside the same eyelets. The eyelet outlines 29 have preferred dimensional ratios. The eyelet outline 29 side facing the plate 6 upper edge 12, between the outer upper angle 30 and the inner upper angle 33, and the eyelet outline 29 side facing the plate 6 lower edge 13, between the outer lower angle 31 and the inner lower angle 32, define an eyelet height H. The eyelet outline 29 side between the outer upper angle 30 and the outer lower angle 31, and the eyelet outline 29 side between the inner upper angle 33 and the inner lower angle 32, define a eyelet width L. Preferably, the ratio between eyelet height H and eyelet curvature radius Ro of the single eyelet contact portion 29' ranges between 2-2.1. Alternatively or in addition, the ratio between the eyelet width L and eyelet curvature radius Ro of the single eyelet contact portion 29 is preferably of about 2. For example, eyelet height H can be of about 15.5 mm, eyelet width L can be of about 15 mm, and the eyelet curvature radius Ro of the eyelet contact portion can be of about 7.5 mm.

Figure 5:
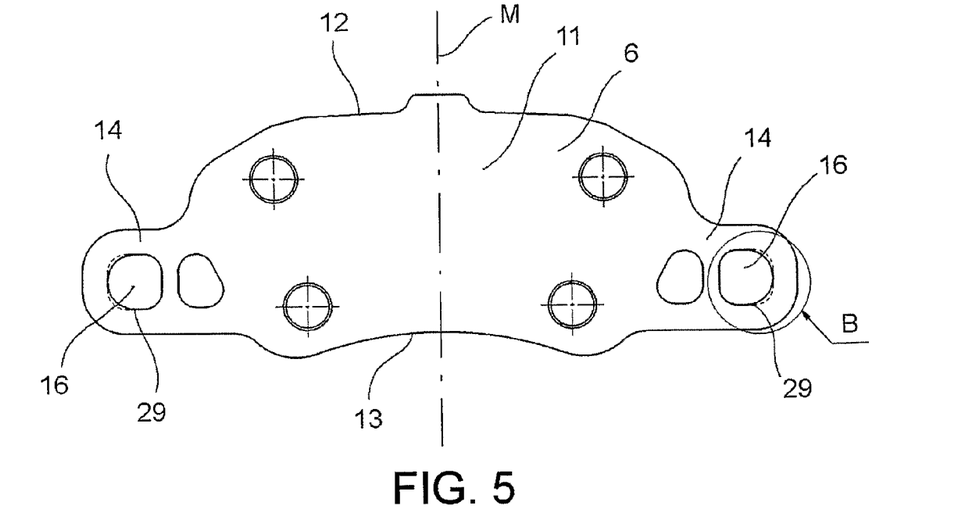
FIG. 5 is a side view of a pad plate of the brake caliper according to a possible further embodiment of the invention.
Figure 6:
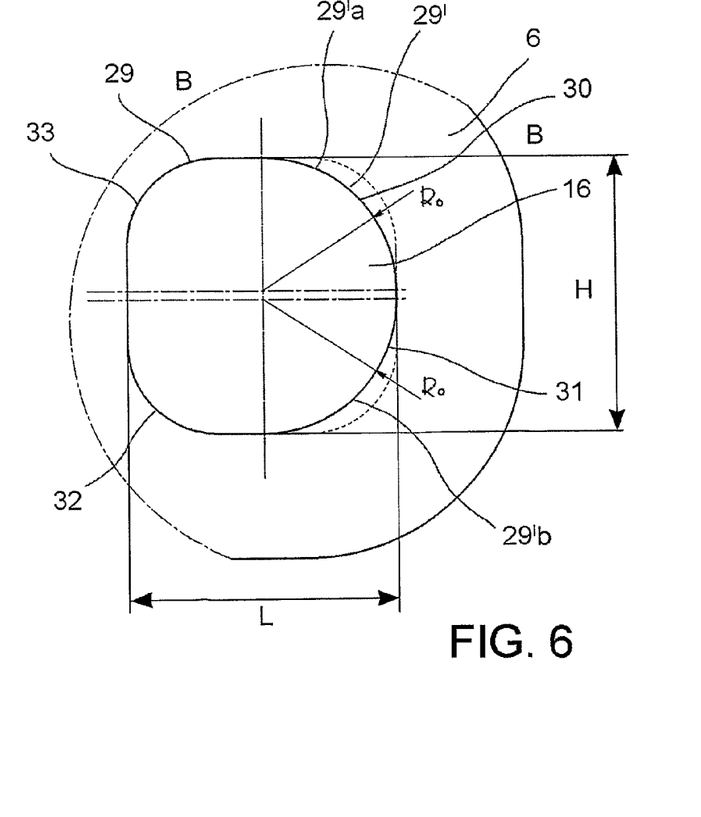
FIG. 6 is an enlargement of the detail B of the plate in FIG. 5.

In accordance with a further possible embodiment, the eyelet outlines 29 have a first eyelet contact portion 29'a and a second eyelet contact portion 29'b (FIGS. 5-6). Such first 29'a and second 29'b eyelet contact portions are preferably arranged respectively at the outer upper angle 30 and the outer lower angle 31. Also according to this embodiment, the eyelets 16 are preferably two for each plate 6, and are arranged on two opposite sides of such plate, in particular in the two support projections 14. Advantageously, the two eyelets 16 have eyelet outlines which are mutually symmetric relative to a median axis M of the pad, passing through the upper 12 and lower 13 edges thereof. Even more advantageously, the eyelet curvature radii Ro of the first 29'a and the second 29'b eyelet contact portions are essentially constant, and the latter have preferably a width of 90°, so as to form circumference quarters the centres of which are arranged inside the same eyelet. The eyelets 16 have, in this case also, preferred dimensional ratios. Preferably, the ratio between the eyelet height H (defined according to what has been described above) and the eyelet curvature radius Ro of the first eyelet contact portion 29'a and/or the second eyelet contact portion 29'b ranges between 2-2.1. Alternatively, or in addition, the ratio between eyelet width L (defined according to what has been described above) and the eyelet curvature radius Ro of the first eyelet contact portion 29'a and/or the second eyelet contact portion 29'b is about 2. For example, the eyelet height H can be of about 15.5 mm, the eyelet width L can be 15 mm, and the eyelet curvature radii Ro of the first 26'a and second 29'b eyelet contact portions can be about 7.5 mm.

Figure 7:
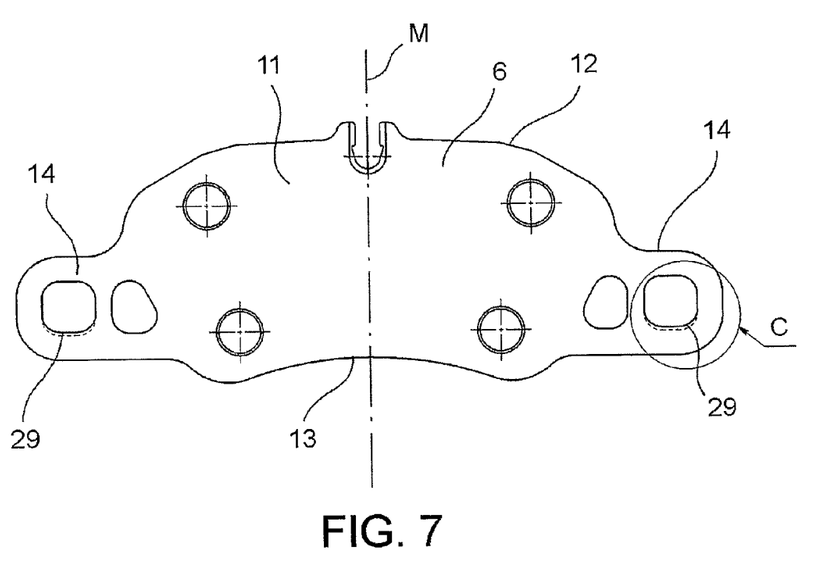
FIG. 7 is a side view of a pad plate of the brake caliper according to a possible further embodiment of the invention.
Figure 8:
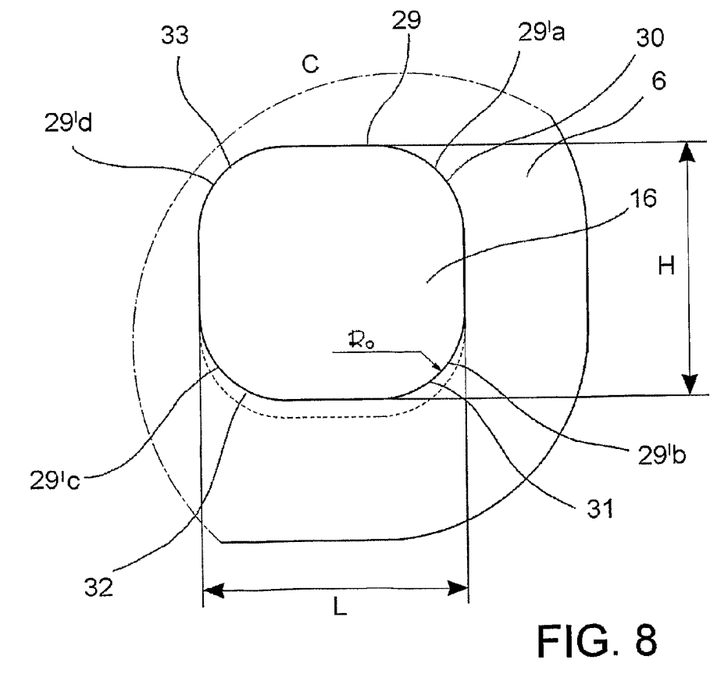
FIG. 8 is an enlargement of the detail C of the plate in FIG. 7.

In accordance with a further possible embodiment, the eyelet outlines 29 have a first eyelet contact portion 29'a, a second eyelet contact portion 29'b, a third eyelet contact portion 29'c, and a fourth eyelet contact portion 29'd (FIGS. 7-8). Such first 29'a, second 29'b, third 29'c, and fourth 29'd eyelet contact portions are preferably arranged respectively at the outer upper angle 30, the outer lower angle 31, the inner lower angle 32, and the inner upper angle 33. Also according to this embodiment, the eyelets 16 are preferably two for each plate 6, and are arranged on two opposite sides of such plate, for example, at the two support projections 14. Advantageously, the two eyelets 16 have eyelet outlines 29 which are mutually symmetric relative to a median axis M of the pad, passing through the upper 12 and lower 13 edges thereof. Even more advantageously, the eyelet curvature radii Ro of the first 29'a, second 29'b, third 29'c, and fourth 29'd eyelet contact portions are essentially constant, and the latter have preferably a width of 90°, so as to form circumference quarters the centres of which are arranged inside the same eyelet. The eyelets 16 have, in this case also, preferred dimensional ratios. Preferably, the ratio between the eyelet height H (defined according to what has been described above) and the curvature radius Ro of the first eyelet contact portion 29'a and/or the second eyelet contact portion 29'b, and/or the third eyelet contact portion 29'c, and/or the fourth eyelet contact portion 29'd is of about 2.9. Alternatively, or in addition, the ratio between the eyelet width L (defined according to what has been described above) and the eyelet curvature radius Ro of the first eyelet contact portion 29'a, and/or the second eyelet contact portion 29'b, and/or the third eyelet contact portion 29'c, and/or the fourth eyelet contact portion 29'd is of about 3. For example, the eyelet height H can be of about 14.5 mm, the eyelet width L can be of about 15 mm, and the eyelet curvature radii Ro of the first, second, third, and fourth eyelet contact portions can be of about 5 mm.

It shall be apparent that, the dimensional ratios, as well as the dimensions provided with reference to the above-described embodiments of the eyelets are to be intended in a merely exemplary, non-limiting sense.

Figure 9:
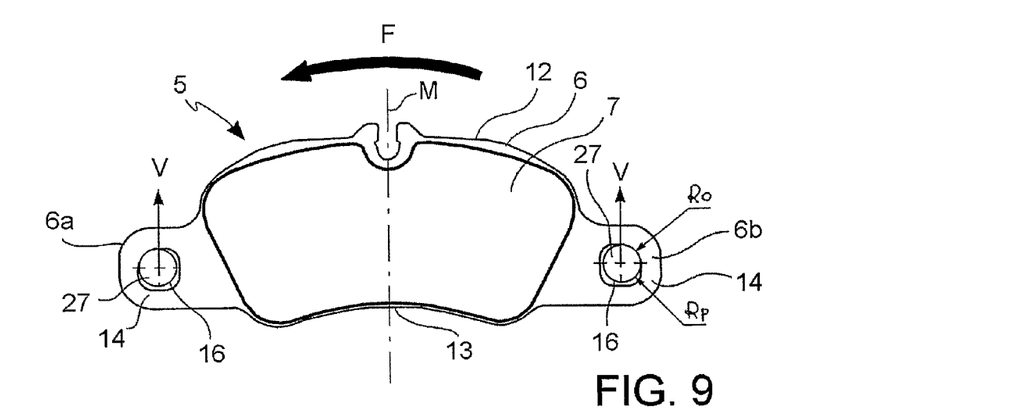
FIGS. 9-11 are illustrations of a brake caliper behaviour according to the invention during use conditions.
Figure 10:
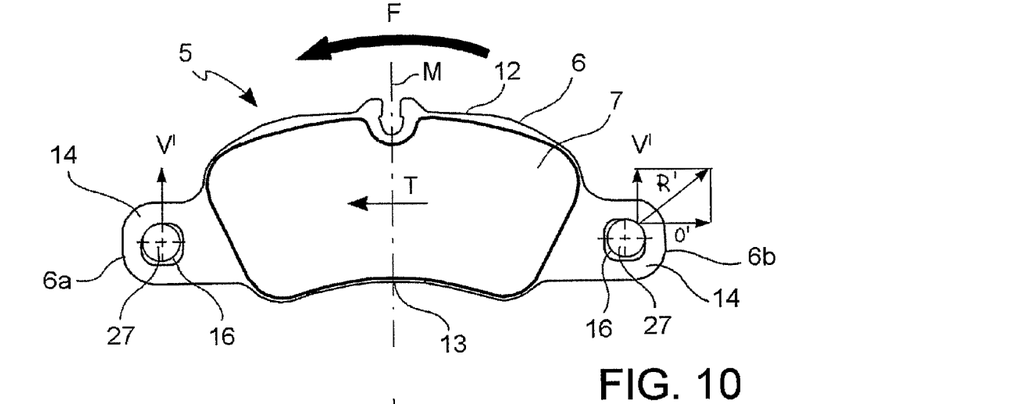

Now, with reference to the FIGS. 9 to 11, the behaviour of a pad and of a brake caliper according to the invention will be described during use conditions. In FIG. 9 the running condition is illustrated, in the absence of a braking action. The arrow F indicates the brake disc (not illustrated) rotation direction, for example, the forward gear. In such conditions, between pad 5 and pins 27 only two respective vertical forces V are essentially present (where the term "vertical" is to be intended in the sense already mentioned with reference to the FIGS. 12-13). When the braking action initiates, therefore the pad 5 begins to be pushed against the braking band of the brake disc, the pad 5 is subjected to a friction force T tangent to the surface of the friction material 7 which tends to drag it according to the disc rotation direction (FIG. 10). At the rear eyelet 16 (on the left in the Figures), a vertical force V' essentially remains, while at the front eyelet 16 (on the right in the Figures), due to what has been already explained before, a vertical force V' and a horizontal force O' originate between pad 5 and pin 27, which give origin to a resulting force R' (the term "horizontal" is also to be intended in the sense already mentioned with reference to the FIGS. 12-13). The resulting R' rotates along the contact portions as the braking action intensity increases, thus gradually orienting outwardly. In other terms, as the braking action intensity increases, the horizontal force O' becomes more and more prominent relative to the vertical force V'. Such phenomenon is due to the gradual relative sliding between pad 5 and front pin 27 along the curved contact portions. Therefore, the pad 5 is gradually (rather than instantaneously, as in the known calipers) subjected to a traction, thereby the squeal phenomenon turns out to be limited.

Figure 11:
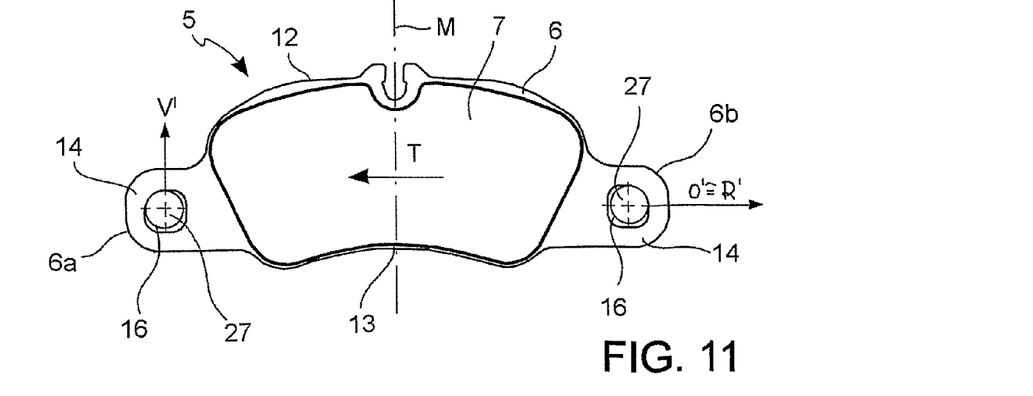

When the braking action intensity is the highest, the horizontal force O' at the front eyelet 16 reaches a maximum, and the resulting force R' essentially coincides therewith (FIG. 11). In these conditions, the braking force is quite integrally transferred to the front pin 27, and the pad 5 is subjected to the maximum traction.

At the end of the braking action, the pad is no more subjected to the friction force T, and goes back to the initial conditions (FIG. 9), mainly under to the action of the already cited elastic means acting thereon.

It shall be apparent that if, as is preferred, the front and rear eyelets 16 have symmetric eyelet outlines 29 relative to the pad 5 median axis M, the pad 5 behaviour in the case of a braking action during the reverse gear will be completely similar to the one described above with reference to the forward gear, with the difference that the braking force T, which will have an opposite direction, will be discharged on the rear pin 27 instead on the front pin 27.

From the description given above, those skilled in the art will be able to appreciate how the pad and the brake caliper according to the invention allow considerably reducing the squeal phenomenon. In fact, the conformation of the eyelet and pin contact outlines makes so that pad and pins, following to the braking action, are not subjected to mutual, sudden impacts, but perform gradual relative movements, similar to the relative movements which occur between a cam and a follower. In other terms, the pin accompanies the pad movement due to the braking action.

Furthermore, those skilled in the art will be able to appreciate how pad and brake caliper according to the invention allow reducing the squeal phenomenon both following a braking action during the forward gear, and following a braking action during the reverse gear. Particular advantage is achieved in the presence of a reverse of the vehicle on which the caliper is installed. In such circumstance, in fact, the pad is subjected to successive opposite friction forces, but the conformation of eyelets and pins makes so that the squeal phenomenon is reduced almost under both circumstances.

Finally, thanks to the conformation of the pin and eyelet contact outlines, the overall comfort of the vehicle on which the brake caliper is installed turns out to be high.

To the above-described embodiments of the pad and the brake caliper according to the invention, those skilled in the art, to the aim of meeting contingent, specific needs, will be able to make several additions, modifications, or substitutions of elements with others functionally equivalent, without for this departing from the scope of the annexed claims.

Each of the characteristics described as belonging to an embodiment can be implemented independently form the other embodiments described.

The invention claimed is:

1. A pad for a brake caliper of a disc brake suitable to be clamped against a braking band of a brake disc of said disc brake, said pad having eyelets for receiving corresponding pins of the caliper, in which said pins define pin outlines, and said eyelets define eyelet outlines, said pin outlines having one or more curved pin contact portions with pin curvature radii, and said eyelet outlines having one or more curved eyelet contact portions with eyelet curvature radii, so that the contact between the pad and the pins can occur at least partially at said pin and eyelet contact portions, wherein
    the eyelet curvature radii are greater than the pin curvature radii, and
    the eyelets and the pins are shaped and arranged so that contact between the contact portions of the pins and eyelets takes place solely at one point at a time and does not involve other points,
    the eyelets being arranged so that, following said braking band clamping, the pad is drawn on one or the other of the two pins as a function of the rotation direction of said brake disc,
    wherein the eyelet outlines of said two eyelets are mutually symmetric relative to a median axis of the pad, and
    wherein said eyelet outlines are closed and have an essentially rectangular or squared shape, with an outer upper corner, an outer lower corner, an inner lower corner, and an inner upper corner which are rounded, one or more of said rounded corners forming said eyelet contact portions.

2. The pad according to claim 1, wherein the pad has a central portion, an upper edge, an opposite lower edge, two side edges, and two support projections extending from said side edges, said eyelets being formed in said two support projections, respectively.

3. The pad according to claim 1, further comprising a plate, and a coating of friction material connected or connectable to said plate, said one or more eyelets being formed in said plate externally to the area of said friction material.

4. The pad according to claim 1, wherein the eyelet curvature radii of each eyelet is essentially mutually equal and/or wherein the eyelet curvature radii of each eyelet is essentially constant, so that the eyelet contact portions have the shape of arcs of circumference and/or wherein said arcs of circumference of the eyelet contact portions have a width of about 90°, thereby forming circumference quarters.

5. The pad according to claim 1, wherein said eyelet outlines of each eyelet have a single one of said eyelet contact portions arranged at said rounded outer upper corner and/or wherein the ratio between the height of each eyelet and the eyelet curvature radius of said single eyelet contact portion ranges between 2-2.1, and/or the ratio between the width of each eyelet and the eyelet curvature radius of said single eyelet contact portion is of about 2.

6. The pad according to claim 1, wherein said eyelet outlines have a first one of said eyelet contact portions at said rounded outer upper corner, and a second one of said eyelet contact portions at said outer lower corner and/or wherein the ratio between the height of each eyelet and the eyelet curvature radius of said first and/or second eyelet contact portions ranges between 2-2.1, and/or the ratio between the length of each eyelet and the eyelet curvature radius of said first and/or second eyelet contact portions is of about 2.

7. The pad according to claim 1, wherein said eyelet outlines have a first one, a second one, a third one, and a fourth one of said eyelet contact portions at said rounded outer upper corner, outer lower corner, inner upper corner, and outer upper corner respectively, and/or wherein the ratio between the height of each eyelet and the curvature radii of said first, and/or second, and/or third, and/or fourth eyelet contact portions is of about 2.9, and/or the ratio between the width of the eyelet and the curvature radii of said first, and/or second, and/or third, and/or fourth eyelet contact portions is of about 3.

8. A brake caliper for disc brake, comprising one or more pads suitable to be clamped against a braking band of a brake disc of the disc brake and provided with one or more eyelets receiving corresponding pins of the caliper, in which said pins define pin outlines, and said eyelets define eyelet outlines, said pin outlines having one or more curved pin contact portions with pin curvature radii, and said eyelet outlines having one or more curved eyelet contact portions with eyelet curvature radii, the contact between the pads and the pins occurring at least partially at said pin and eyelet contact portions, wherein the eyelet curvature radii are greater than the pin curvature radii, and wherein each eyelet and its corresponding pin are shaped and arranged so that contact between the contact portions of the pins and eyelets takes place solely at one point at a time and does not involve other points, each of said one or more pads comprises two of said eyelets, and wherein said brake caliper comprises two of said pins, the two pins and the two eyelets being arranged so that, following said clamping of the braking band, said one or more pads are drawn on one or the other of the two pins as a function of the rotation direction of said brake disc, wherein the eyelet outlines of said two eyelets are mutually symmetric relative to a median axis of the pad, and wherein said eyelet outlines are closed and have an essentially rectangular or squared shape, with an outer upper corner, an outer lower corner, an inner lower corner, and an inner upper corner which are rounded, one or more of said rounded corners forming said eyelet contact portions.

9. The brake caliper according to claim 8, wherein said brake caliper comprises two of said pins, the pins and the eyelets being arranged so that, following said clamping of the braking band, said one or more pads are drawn on one or the other of the pins as a function of the rotation direction of said brake disc.

10. The brake caliper according to claim 9, wherein said one or more pads have a central portion, an upper edge, an opposite lower edge, two side edges, and two support projections extending from said side edges, said two eyelets being formed respectively in said two support projections.

11. The brake caliper according to claim 8, wherein said one or more pads comprise a plate and a coating of friction material connected or connectable to said plate, said one or more eyelets being formed in said plate externally to the area of said friction material.

12. The brake caliper according to claim 8, wherein the eyelet curvature radii of each eyelet of said one or more pads are essentially constant, so that the eyelet contact portions have the shape of arcs of circumference.

13. The brake caliper according to claim 12, wherein said arcs of circumference of the eyelet contact portions have a width of about 90°, thus forming circumference quarters.

14. The brake caliper according to claim 8, wherein said pin outlines have an essentially circular shape.

15. The brake caliper according to claim 8, wherein said eyelet outlines of each eyelet have a single one of said eyelet contact portions arranged at said rounded outer upper corner.

16. The brake caliper according to claim 15, wherein the ratio between the height of each eyelet and the eyelet curvature radius of said single eyelet contact portion ranges between 2-2.1, and/or the ratio between the width of each eyelet and the eyelet curvature radius of said single eyelet contact portion is of about 2.

17. The brake caliper according to claim 8, wherein said eyelet outlines have a first one of said eyelet contact portions at said rounded outer upper corner, and a second one of said eyelet contact portions at said outer lower corner.

18. The brake caliper according to claim 17, wherein the ratio between the height of each eyelet and the eyelet curvature radius of said first and/or second eyelet contact portions ranges between 2-2.1, and/or the ratio between the width of each eyelet and the eyelet curvature radius of said first and/or second eyelet contact portions is of about 2.

19. The brake caliper (1) according to claim 8, wherein said eyelet outlines have a first one, a second one, a third one, and a fourth one of said eyelet contact portions at said rounded outer upper corner, outer lower corner, inner upper corner, and inner upper corner, respectively.

20. The brake caliper according to claim 19, wherein the ratio between the height of each eyelet and the curvature radii of said first and/or second, and/or third, and/or fourth eyelet contact portions is of about 2.9, and/or the ratio between the width of the eyelet and the curvature radii of said first, and/or second, and/or third, and/or fourth eyelet contact portions is of about 3.

* * * * *